United States Patent [19]

Isono et al.

[11] 4,183,048
[45] Jan. 8, 1980

[54] VIR-CONTROLLED HUE CORRECTION CIRCUIT

[75] Inventors: Katsuo Isono, Kawagoe; Seiji Sanada, Yokosuka, both of Japan

[73] Assignee: Sony Corporation, Tokyo, Japan

[21] Appl. No.: 942,817

[22] Filed: Sep. 18, 1978

[30] Foreign Application Priority Data

Sep. 30, 1977 [JP] Japan .................. 52-118428

[51] Int. Cl.$^2$ ........................................... H04N 9/535
[52] U.S. Cl. ................................ 358/28; 358/21 V
[58] Field of Search ................... 358/28, 27, 21 VI

[56] References Cited

U.S. PATENT DOCUMENTS

| | | | |
|---|---|---|---|
| 3,755,617 | 8/1973 | Ichida | 358/28 |
| 4,059,838 | 11/1977 | Banker et al. | 358/27 |
| 4,130,831 | 12/1978 | Isono et al. | 358/28 |

*Primary Examiner*—Richard Murray
*Attorney, Agent, or Firm*—Lewis H Eslinger; Alvin Sinderbrand

[57] ABSTRACT

A hue correction circuit for use in video display apparatus which is responsive to a composite color video signal including luminance, chrominance, burst and VIR signals. A controllable local oscillator circuit generates a reference oscillating signal of controllable phase for use in demodulating the chrominance signal. A first phase control circuit is responsive to the burst signal for deriving a first phase control signal as a function of the phase error between the burst signal and the reference oscillating signal, this first phase control signal being applied to the local oscillator circuit to vary the phase thereof for minimizing the phase error. A gain controlled amplifier is connected to receive the luminance signal and has a controllable gain for deriving a second phase control signal as a function of the luminance signal, this second phase control signal being applied to the local oscillator circuit to vary the phase thereof. The gain of the gain controlled amplifier is varied as a function of the phase error between the chrominance reference component included in the VIR signal and the reference oscillating signal. In one embodiment, the local oscillator circuit comprises a voltage-controlled oscillator which receives the first phase control signal as the control voltage therefor, the output of this voltage-controlled oscillator being coupled to a controllable phase shifter which receives the second phase control signal. In another embodiment, the local oscillator circuit is a voltage-controlled oscillator whose phase is controlled by the output of a matrix circuit, the latter receiving both the first and second phase control signals. In this embodiment, a differentiated version of the luminance signal is amplified by the gain controlled amplifier to produce the second phase control signal.

11 Claims, 11 Drawing Figures

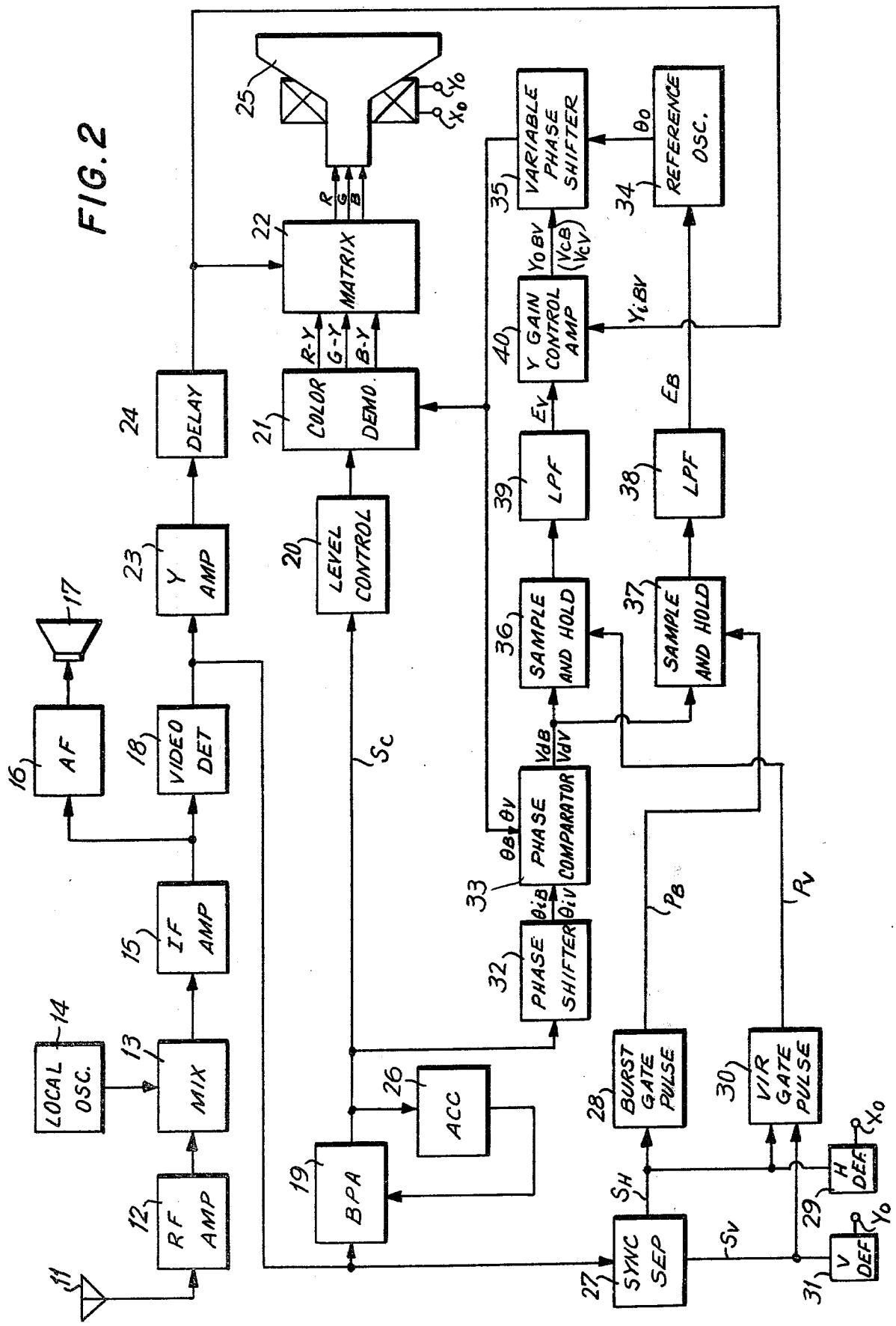

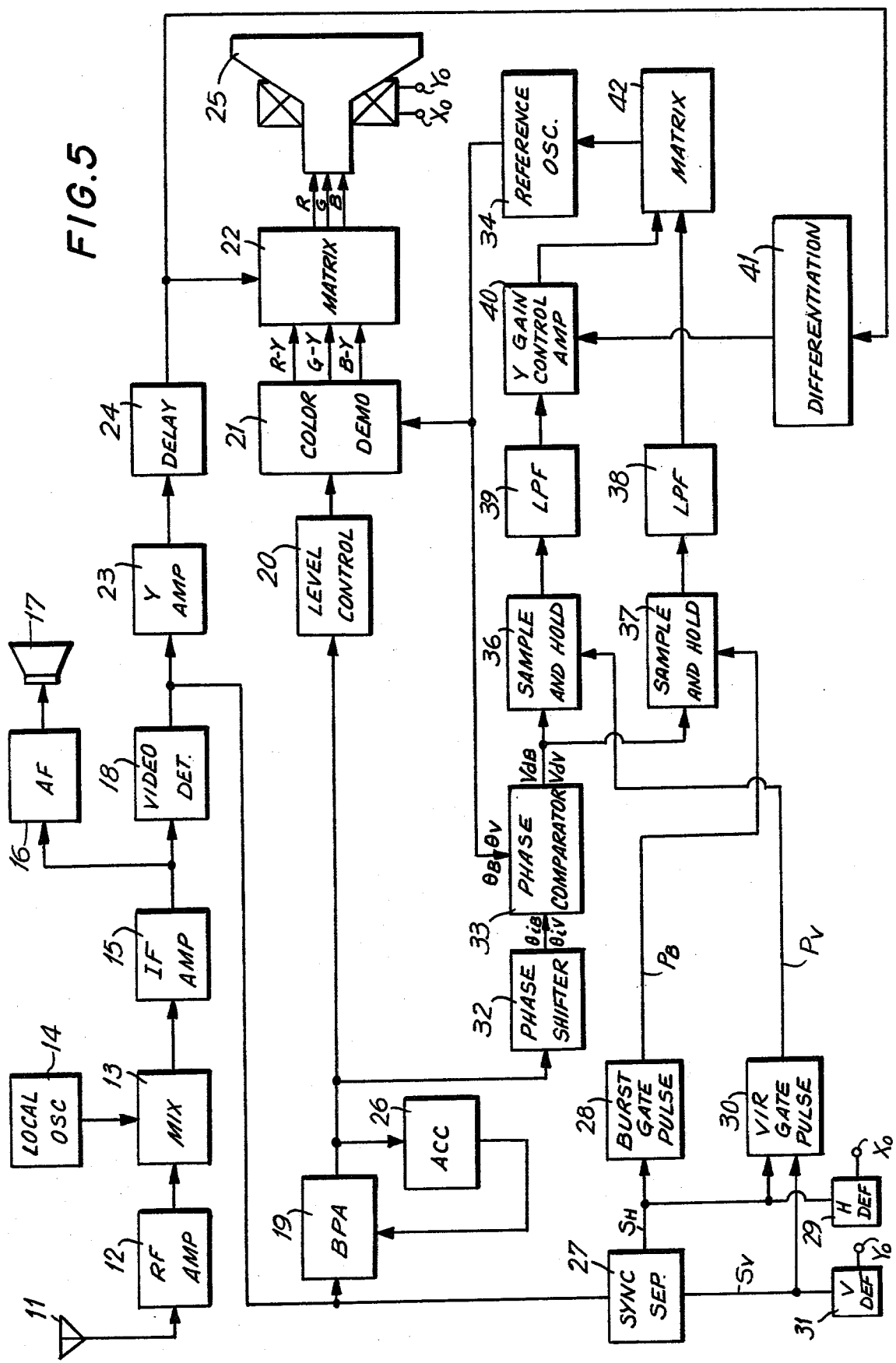

VIR-CONTROLLED HUE CORRECTION CIRCUIT

BACKGROUND OF THE INVENTION

This invention relates to a VIR-controlled hue correction circuit for use in video display apparatus and, more particularly, to such a hue correction circuit which produces a correction signal that is a function of the luminance level of the received composite color video signal.

In video display apparatus, such as a color television receiver, phase shifts in the chrominance signal of the composite color video signal supplied to the video display apparatus can result in hue distortion in the reproduced color picture. That is, the hue of the reproduced color picture will differ from that of the originally televised scene. If the composite color video signal which is supplied to the video display apparatus is a transmitted signal, such phase shifts may be attributed to various disturbances in the transmission path which affect the chrominance signal to a different degree than the burst signal. Because of this, the chrominance signal may be shifted by an amount which differs from a phase shift in the burst signal, thereby preventing the usual control circuits from eliminating any relative phase differential between the chrominance and burst signals.

If the video display apparatus is a television monitor for displaying video pictures reproduced from a video recorder, such as a video tape recorder (VTR), a phase shift may be imparted to the chrominance signal, resulting in a differential phase error between the chrominance and burst signals, with a concomitant hue distortion in the reproduced video picture. This differential phase error is caused by the fact that, in many VTR devices, the chrominance signal is frequency-converted to a lower frequency range while the luminance signal frequency modulates a higher frequency carrier, the frequency-modulated luminance signal then serving as a carrier onto which the frequency-converted chrominance signal is superimposed. As a result thereof, the frequency-modulated luminance component serves as a biasing level for the frequency-converted chrominance component. Consequently, upon reproduction, the chrominance signal is subjected to phase distortion in dependence upon changes in the luminance signal.

In order to minimize the aforementioned differential phase error due to factors in the transmission path or due to the changing biasing level of the chrominance signal in a video recorder, it has been proposed to insert a vertical interval reference (VIR) signal into a predetermined portion of the vertical interval of the video signal. For the purpose of standardization, the VIR signal is inserted into the nineteenth line interval of the transmission of many broadcasted color video signals. The purpose of this inserted VIR signal is to provide certain predetermined reference parameters, or characteristics, whereby video signal receiving apparatus, upon detecting these parameters or chracteristics, can effect an automatic hue correction operation, whereby the ultimately reproduced color video picture is substantially free of hue distortion.

The VIR signal which is used in television broadcast transmissions is formed of a reference subcarrier, equal in frequency and phase to the usual color burst signal, this reference subcarrier being superposed on a predetermined reference luminance level and being transmitted during a preselected chrominance reference portion of the VIR signal. This is designated as the chrominance reference component. Following this chrominance reference component, the VIR signal is provided with a luminance reference component of predetermined amplitude and duration. A black reference component of a respectively predetermined amplitude and duration then follows the luminance reference component. When the VIR signal is received, or reproduced from a video recording, the reference information provided by the chrominance reference component, the luminance reference component and the black reference component is used to control various characteristics, such as the gain or level of the chrominance channel, thereby controlling the color saturation of the reproduced video picture, and the phase of the locally generated oscillating signal used for demodulation, thereby controlling the hue characteristic of the reproduced picture. Although the chrominance and luminance reference components included in the VIR signal would be visible, it is appreciated that the nineteenth line interval is at a portion of the raster scanned by the electron beam in the CRT which is not viewed. Hence, the VIR signal does not interfere with the displayed video picture.

In previously proposed VIR-controlled hue correction circuits, the level of one of the demodulated color difference signals produced in response to the VIR signal is detected. If this demodulated level differs from a predetermined level, this difference corresponds to a differential phase error between the phase of the local oscillating signal which is used for demodulation and the received chrominance reference component. Consequently, the resultant phase error is used to vary the phase of the local oscillating signal, thereby minimizing the hue distortion. Typical of this type of VIR-controlled hue correction circuit is described in U.S. Pat. No. 3,950,780, issued Apr. 13, 1976. An improved VIR-controlled hue correction circuit is disclosed in our copending application No. 839,847, filed Oct. 6, 1977. Yet another example of such VIR-controlled hue correction circuitry is disclosed in our copending application No. 825,186, filed Aug. 16, 1977.

In the VIR signal which currently is used in broadcast transmissions, the chrominance reference component is superposed onto a luminance reference level of 70 IRE units. This luminance reference level corresponds to the average luminance level of Caucasian skin tones. It is expected that, in a displayed video picture, although the hue of various objects therein may be unknown, and may not be recognized, the hue of Caucasian skin tones will be readily perceived and identified. Thus, the standardized VIR signal is intended to correct the hue of the displayed video picture so that such Caucasian skin tones are reproduced correctly.

In many instances, the hue of the reproduced video picture varies as a function of the luminance level. Thus, although the correct hue is displayed for Caucasian skin tones, other luminance levels, and particularly other skin tones, such as Asian or Mongolian skin tones, Negro skin tones, and the like, may not be reproduced accurately. That is, since the chrominance reference component is superimposed onto the luminance level of 70 IRE units, other chrominance signals which are superposed onto different luminance levels may have differential phase errors which are not fully corrected. Thus, the skin tones of Mongolian or Asian skin, having luminance levels between 40–60 IRE units, and skin tones for Negro skin having luminance levels between 20–40 IRE units may be reproduced with improper hue.

Hence, hue distortion may be present in video pictures of images of persons having skin tones other than Caucasian. Hue distortion also will be present in the images of objects whose luminance levels differ from the average Caucasian level of 70 IRE units.

In our copending application Ser. No. 894,513, filed Apr. 7, 1978, VIR-controlled hue correction circuitry is disclosed for overcoming the aforementioned problems. As disclosed therein, the differential phase error between the burst signal and the chrominance reference component of the VIR signal is controlled in dependence upon the luminance level of the received video signal. The present invention disclosed herein is directed to an alternative technique for overcoming the aforenoted difficulties and problems, and for correcting the hue of a displayed video picture as a function of the luminance levels therein.

OBJECTS OF THE INVENTION

Therefore, it is an object of the present invention to provide an improved VIR-controlled hue correction circuit which overcomes the problems and difficulties of prior art VIR-controlled circuitry.

Another object of this invention is to provide an improved VIR-controlled hue correction circuit which is adapted to correct for hue distortions in a displayed video picture even if the image of the person in that picture is provided with Caucasian, Mongolian or Asian, or Negro skin tones.

A further object of this invention is to provide a VIR-controlled hue correction circuit which is responsive to a VIR signal and, moreover, is responsive to differing luminance levels for correcting hue distortions in the displayed video picture.

An additional object of this invention is to provide an improved VIR-controlled hue correction circuit which is readily adaptable to an automatic phase control (APC) circuit normally used for controlling the phase of the locally-generated reference subcarrier which is utilized for demodulating the received composite color video signal.

Various other objects, advantages and features of the present invention will become readily apparent from the ensuing detailed description, and the novel features will be particularly pointed out in the appended claims.

SUMMARY OF THE INVENTION

In accordance with this invention, a VIR-controlled hue correction circuit is provided, including a controllable local oscillator circuit for generating a reference oscillating signal of controllable phase for use in demodulating a received chrominance signal, and a first phase control circuit responsive to a received burst signal for deriving a first phase control signal as a function of the phase error between the burst signal and the reference oscillating signal, this first phase control signal being applied to the local oscillator circuit to vary the phase thereof. A gain controlled amplifier is connected to be supplied with a received luminance signal for deriving a second phase control signal as a function of the level of this luminance signal, the second phase control signal being applied to the local oscillator circuit to vary the phase thereof. The gain of this gain controlled amplifier is varied as a function of the phase error between the chrominance reference component of the VIR signal and the reference oscillating signal. In one embodiment, the local oscillator circuit includes a voltage-controlled oscillator which is controlled by the first phase control signal, and a controllable phase shifter which is controlled by the second phase control signal, the output of the phase shifter being used as the reference oscillating signal. In another embodiment, the controllable local oscillator circuit is comprised of a volatage-controlled oscillator, and the first and second phase control signals are supplied to this voltage-controlled oscillator by a matrix circuit. In this alternative embodiment, the luminance signal is differentiated before being supplied to the gain controlled amplifier.

BRIEF DESCRIPTION OF THE DRAWINGS

The following detailed description, given by way of example, will best be understood in conjunction with the accompanying drawings in which:

FIG. 2 is a block diagram of video signal receiving apparatus which incorporates one embodiment of the present invention;

FIG. 5 is a block diagram of video signal receiving apparatus incorporating another embodiment of the present invention.

DETAILED DESCRIPTION OF PREFERRED EMBODIMENTS

Figure 1:
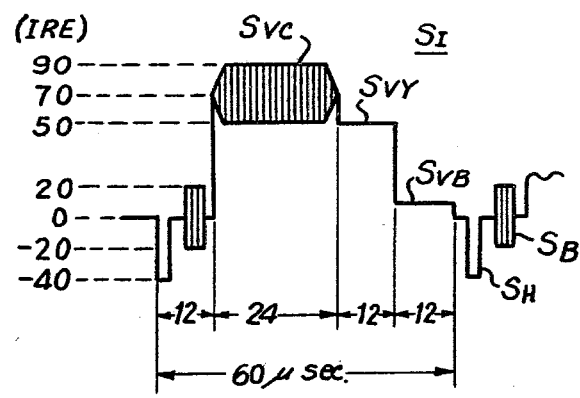
FIG. 1 represents the waveform of a typical VIR signal.

Before proceeding with a discussion of the present invention, reference is made to FIG. 1 which is a waveform representation of a typical VIR signal. As mentioned above, this VIR signal is transmitted during the nineteenth line interval of the composite color television signal. This line interval includes the normal blanking and horizontal synchronizing pulses, as well as the color burst signal. The levels of the different signal components shown in FIG. 1 are expressed in IRE units wherein the difference between the zero pedestal level and the maximum white level is 100 units. The horizontal synchronizing pulse is shown as a negative pulse of 40 units amplitude, and this pulse is followed by a burst signal provided on the pedestal level of zero units. As is conventional, the burst signal is sinusoidal having a frequency equal to the subcarrier frequency of 3.58 MHz. Typically, the burst signal is present for approximately eight cycles. The peak-to-peak amplitude of the burst signal is 40 units and its phase is coincident with the —(B—Y) axis.

Approximately 12 μsec. after the beginning of the line interval containing this VIR signal, the chrominance reference component $S_{VC}$ is provided, this chrominance reference component being formed of the unmodulated subcarrier frequency of 3.58 MHz which is of the same phase as the burst signal. The chrominance reference component is superimposed onto a luminance level of 70 units and exists for a duration of approximately 24 μsec. This luminance level of 70 units corresponds to the luminance level of the average Caucasian skin tone. Following this chrominance reference component $S_{VC}$ is a luminance reference component $S_{VY}$ whose amplitude is 50 units and whose duration is 12 μsec. The luminance reference component $S_{VY}$ is followed by a black reference component $S_{VB}$ having a level of 7.5 units and a duration of 12 μsec. The approximate duration from the start of the horizontal synchronizing pulse to the termination of the black reference level is 60 μsec. The entire VIR signal, including each of the reference components shown therein, is designated as the VIR signal $S_I$.

When the chrominance signal included in the composite color television signal is subjected to phase distortion, as may be due to factors in the transmission path or to the effect of the luminance biasing signal in a recorded video signal, the chrominance reference component $S_{VC}$ of VIR signal $S_I$ will be subjected to a similar phase distortion. Consequently, the differential phase shift between the chrominance reference component $S_{VC}$ and the burst signal $S_B$ is substantially equal to the differential phase shift, or phase distortion, of the chrominance signal corresponding to the average Caucasian skin tone. The purpose of typical VIR control circuitry included in video display apparatus is to control the demodulation axis for the chrominance signal so as to compensate or correct for the aforementioned differential phase distortion. Thus, changes in hue due to this phase distortion can be corrected by minimizing the differential phase error, as by shifting the phase of the local demodulating subcarrier signal, thereby providing correct hue for the average Caucasian skin tones.

While this automatic phase correction generally is performed satisfactorily for chrominance signals having corresponding luminance levels that are approximately 70 IRE units, i.e., chrominance signals whose luminance levels are approximately equal to that of Caucasian skin tones, the differential phase shift between the received chrominance signal and the received burst signal is dependent, to a large degree, on the luminance level on which that chrominance signal is superimposed. Thus, for chrominance signals having corresponding luminance levels that are substantially less than 70 IRE units, proper hue correction may not be achieved. Although the differential phase error may be reduced to zero during the occurrence of the chrominance reference component of the VIR signal and for the subsequent reception of chrominance signals representing Caucasian skin tones, a differential phase error may exist for other chrominance signals. As typical examples, chrominance signals representing Mongolian or Asian skin tones having luminance levels between 40–60 IRE units, as well as chrominance signals representing Negro skin tones having luminance levels between 20–40 IRE units may contain differential phase errors resulting in hue distortions that are not corrected. This problem is overcome in accordance with the present invention wherein a dynamic hue correction is provided, dependent upon the luminance level of the received chrominance signals. That is, the differential phase error correction operation varies as a function of the luminance level so that such differential phase errors can be corrected even as the luminance level differs from the reference luminance level of 70 IRE units upon which the chrominance reference component of the VIR signal is superimposed.

Referring now to FIG. 2, there is illustrated one embodiment of video signal display apparatus incorporating an embodiment of the present invention. This video signal display apparatus is included in a television receiver which includes the usual signal detection circuitry, synchronizing signal separating circuitry, and the like. The video signal receiving circuitry includes an RF amplifier 12 coupled to an antenna 11 for amplifying the video RF signals received by the antenna. As may be appreciated, any suitable source of video signal may be supplied to the RF amplifier; and antenna 11 may be replaced by a transmission line, if desired. The amplified video RF signal is supplied to a mixer 13 which also receives an oscillating signal from local oscillator 14. Depending upon the frequency of the oscillating signal supplied to mixer 13 by this local oscillator, the illustrated television receiver is tuned to a corresponding broadcast frequency, and thus to a corresponding broadcast channel. The output of mixer 13 comprises an intermediate frequency (IF) signal which is amplified by IF amplifier 15. The amplified video IF signal then is supplied from the IF amplifier to audio processing circuitry 16 and also to a video detector 18.

Audio processing circuitry 16 includes the usual audio detecting and amplifying circuitry for detecting the audio components which are included in the amplified IF signal. Once these audio components are suitably amplified, they are used to drive a speaker system 17 for reproducing the sound which accompanies the video signal.

Video detector 18 detects the composite color video signal included in the amplified IF signal. Accordingly, the output of the video detector includes the luminance signal, the chrominance signal, the burst signal and the synchronizing signals, all included in the composite color video signal. It should be appreciated that if the broadcasted video signal also includes a VIR signal, this VIR signal is present at the output of video detector 18, i.e., during the nineteenth line interval of the video signal. The output of video detector 18 is coupled to a chrominance channel, to a luminance channel and to a synchronizing separator circuit 27.

The luminance channel includes a luminance amplifier 23 for amplifying the luminance signal included in the composite color video signal. The amplified luminance signal (Y) then is supplied through a delay circuit 24 to a matrix circuit 22 whereat it is used in combination with the color difference signals, to be described, to produce red, green and blue color drive signals R, G and B, respectively. The purpose of delay circuit 24 is to adjust the times of occurrence of the amplified luminance signal so as to be in synchronism with the chrominance signal, the latter being subjected to greater inherent delays in the chrominance channel.

The chrominance channel includes a band pass amplifier 19 having a frequency bandwidth that is centered on the chrominance subcarrier. Typically, and in accordance with the NTSC standard, this chrominance subcarrier has a frequency of approximately 3.58 MHz. Consequently, the output of bandpass amplifier 19 generally is limited to the chrominance signal $S_C$ and the burst signal $S_B$. An automatic chrominance control (ACC) circuit 26 is connected in a feedback loop to bandpass amplifier 19. As is known, this automatic chrominance control circuit functions to maintain the level of the chrominance signal at the proper level thereof notwithstanding fluctuations in the chrominance signal due to, for example, factors in the transmission path. Typically, the automatic chrominance control circuit may include a burst gate for separating the burst signal from the output of band-pass amplifier 18, a ringing amplifier for generating a replica of the burst signal having a frequency, phase and amplitude determined by the separated burst signal, and an amplitude detector for detecting the amplitude of the output of this ringing amplifier, this detector being used to control the gain of the band pass amplifier. Changes in the saturation characteristic, that is, the level, of the chrominance signal appear as corresponding changes in the burst signal. These changes are detected and used to compensate the gain of the band pass amplifier so as to maintain a substantially constant saturation characteristic.

The chrominance signal having a properly controlled level is supplied from band pass amplifier 19 to a level control circuit 20. The purpose of this level control circuit is to further vary the saturation characteristic of the chrominance signal either in accordance with the viewer's preference or as a function of the detected VIR signal. Thus, level control circuit 20 may include a gain-controlled amplifier or, as an alternative, an adjustable attenuator. The level-controlled chrominance signal then is supplied to a color demodulator 21 for demodulating the respective red, green and blue color difference signals R-Y, G-Y and B-Y, respectively, therefrom. To this effect, a reference oscillating signal, also known as the local subcarrier, is supplied to the color demodulator for use as a demodulating signal. As one example thereof, color demodulator 21 may include a plurality of synchronous demodulators to which the local subcarrier is supplied in proper phase relation so as to produce the respective color difference signals. If there is a variation in the phase relation between the local subcarrier and the chrominance signal, hue distortions result therefrom. Hence, to avoid or compensate for such hue distortions, such phase variations, referred to herein as the phase error, are detected and used either to shift the phase of the local subcarrier or the phase of the chrominance signal.

The demodulated color difference signals R-Y, G-Y and B-Y are supplied to matrix circuit 22 whereat they are combined with the luminance signal (Y) to derive the individual color drive signals R, G and B. These color drive signals are supplied to respective cathodes of the video display tube 25, which typically comprises a cathode ray tube (CRT), whereby such color drive signals control the beam current of the respective red, green and blue electron beams as these beams scan a raster across the display screen of the CRT. A suitable scanning yoke assembly, responsive to horizontal scanning signals $X_o$ and vertical scanning signals $Y_o$ is provided to control the horizontal and vertical deflection of the electron beams.

The output of video detector 18 also is coupled to synchronizing separator circuit 27 which functions to separate the horizontal synchronizing pulses $S_H$ and the vertical synchronizing signal $S_V$ from the detected composite color video signal. The separated horizontal synchronizing pulses $S_H$ are supplied to horizontal deflection circuit 29 for deriving the horizontal deflection voltage $X_o$. Similarly, the separated vertical synchronizing signal $S_V$ is supplied to vertical deflection circuit 31 for deriving the vertical deflection voltage $Y_o$. These horizontal and vertical deflection voltages are used to drive the aforementioned scanning yoke assembly provided with CRT 25.

A burst gate pulse generator 28 is coupled to synchronizing signal separator circuit 27 for generating burst gate pulses $P_B$ in response to the separated horizontal synchronizing pulses $S_H$. As is apparent from the waveform shown in FIG. 1, the separated horizontal synchronizing pulse is delayed by a predetermined amount in order to coincide with the time of occurrence of the burst signal $S_B$. The delayed horizontal synchronizing pulse is used to generate the burst gate pulse. As an example thereof, burst gate pulse generator 28 may include a suitable monostable multivibrator which is triggered by the delayed horizontal synchronizing pulse.

The separated horizontal synchronizing pulses $S_H$ and the separated vertical synchronizing signal $S_V$ are supplied by synchronizing separator circuit 27 to a VIR gate pulse generator 30. The VIR gate pulse generator may include conventional counting and gating circuits such that, when vertical synchronizing signal $S_V$ is detected thereby, the counting circuits are activated to count successive horizontal synchronizing pulses $S_H$ so as to determine when the nineteenth horizontal line interval is present. Multivibrator circuits also may include a VIR gate pulse generator 30 to be energized once this nineteenth horizontal line interval is identified, thereby producing VIR gate pulses $P_V$ which coincide with the chrominance reference component $S_{VC}$ included in a received VIR signal.

The hue correction circuit incorporated into the apparatus illustrated in FIG. 2 is comprised of a phase comparator 33, a local oscillator 34, a controllable phase shifter 35, sample-and-hold circuits 36 and 37 and a gain controlled amplifier 40. Phase comparator 33 is adapted to compare the phase of the burst signal included in the chrominance signal provided at the output of band pass amplifier 19 to the phase of the local oscillating signal generated by local oscillator 34. Additionally, phase comparator 33 is adapted to compare the phase of the chrominance reference component included in the VIR signal to the phase of the local oscillating signal generated by the local oscillator. To this effect, one input of phase comparator 33 is coupled to the output of band pass amplifier 19 via a phase shift circuit 32. This phase shift circuit includes an adjustable component, such as a potentiometer (not shown) to vary the phase of the signal supplied to phase comparator 33. As may be appreciated, this potentiometer enables the viewer to adjust the hue of the displayed video picture in accordance with his own preference. The other input of phase comparator 33 is coupled to local oscillator 34 via controllable phase shifter 35. For the purpose of describing the illustrated embodiment, the combination of local oscillator 34 and controllable phase shifter 35 may be considered to be a reference oscillator for generating the local subcarrier which is used in color demodulator 21 for demodulating the received chrominance signal.

The output of phase comparator 33 is connected in common to sample-and-hold circuits 36 and 37 for supplying phase error voltages thereto. It may be recognized that, at the time of occurrence of burst signal $S_B$, a phase error voltage $V_{dB}$ produced by phase comparator 33 represents the phase error between the received burst signal and the local oscillating signal, or local subcarrier, produced at the output of controllable phase shifter 35. Similarly, at the time of occurrence of the chrominance reference component of the VIR signal, the phase error voltage $V_{dV}$ produced by phase comparator 33 represents the phase error between the received chrominance reference component and the local oscillating signal, or local subcarrier, produced by controllable phase shifter 35. Sample-and-hold circuit 37 is adapted to sample the phase error voltage $V_{dB}$, referred to herein as the burst phase error voltage, and is connected to burst gate pulse generator 28 for receiving the burst gate pulse $P_B$ supplied thereto as a sampling pulse. Sample-and-hold circuit 36 is adapted to sample the phase error voltage $V_{dV}$, referred to herein as the VIR phase error voltage, and is connected to the output of VIR gate pulse generator 30 for receiving the VIR gate pulse $P_V$ which is supplied thereto as a sampling pulse. The output of sample-and-hold circuit 37 is connected to a low pass filter 38 for smoothing the sampled burst phase error voltage and produce a DC burst error signal $E_B$. Similarly, the output of sample-and-hold circuit 36 is connected to a low pass filter 39 from which a DC VIR error signal $E_V$ is produced.

Local oscillator 34 preferably is a voltage-controlled oscillator (VCO) responsive to the burst error signal $E_B$ supplied thereto for varying the phase $\theta_o$ of the local oscillating signal generated thereby. The phase of this local oscillating signal is further varied by controllable phase shifter 35 in response to a phase control signal supplied to this controllable phase shifter.

The output of low pass filter 39 is coupled to a control input of gain controlled amplifier 40. The gain of amplifier 40 is determined as a function of the VIR error signal $E_V$ supplied thereto. A signal input of gain controlled amplifier 40 is connected to delay circuit 24 for receiving the luminance signal and for amplifying this luminance signal as a function of the VIR error signal $E_V$ supplied thereto as a gain controlling signal. The output of amplifier 40, which is seen to be the amplified luminance signal, is supplied as the phase control signal to controllable phase shifter 35.

Figure 3A:
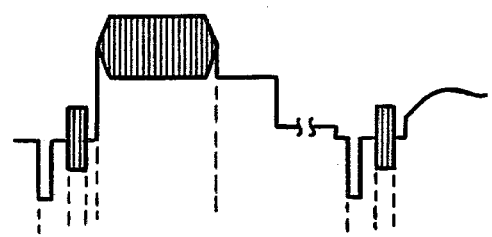
FIGS. 3A–3G are waveform diagrams which are useful in understanding the operation of the embodiment shown in FIG. 2.
Figure 3B:
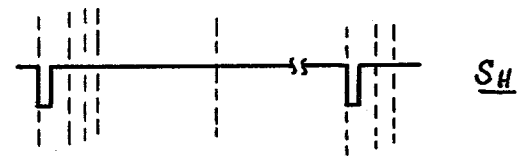
Figure 3C:
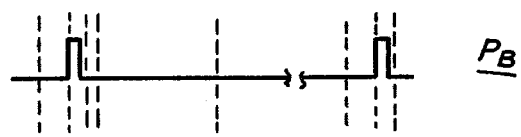
Figure 3D:
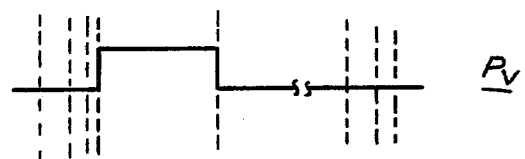

The manner in which the VIR-controlled hue correction circuit illustrated in FIG. 2 operates now will be described with reference to the waveform diagrams shown in FIGS. 3A-3G. Let it be assumed that the VIR signal produced at the output of video detector 18 during the nineteenth line interval of the composite color video signal appears as shown in FIG. 3A. This signal is supplied from the video detector to synchronizing signal separator 27 which separates the horizontal synchronizing pulses $S_H$ (FIG. 3B) therefrom. The separated horizontal synchronizing pulses $S_H$ are supplied to burst gate pulse generator 28 and, together with the separated vertical synchronizing signal $S_V$, to VIR gate pulse generator 30. The burst gate pulse generator generates burst gate pulses $P_B$ in time coincidence with the received burst signals, as shown in FIG. 3C. The VIR gate pulse generator generates VIR gate pulses $P_V$ in time coincidence with the chrominance reference component of the received VIR signal, as shown in FIG. 3D. These burst and VIR gate pulses are supplied to sample-and-hold circuits 37 and 36, respectively.

Figure 3E:
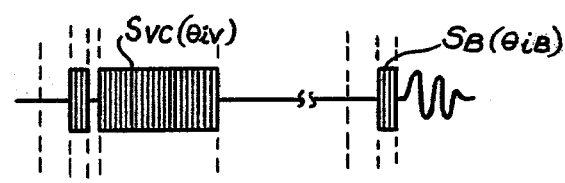

As mentioned above, band pass amplifier 19 passes the burst and chrominance signals which are included in the output of video detector 18. The level of the chrominance signal is suitably controlled by level control circuit 20 and supplied to color demodulator 21 whereat the respective color difference signals are demodulated therefrom. The burst and chrominance signals also are supplied to phase comparator 33 after being suitably phase shifted, as desired by the operator, by phase shift circuit 32. FIG. 3E represents the burst signal $S_B$ supplied to phase comparator 33 with phase $\theta_{iB}$; and also illustrates the chrominance reference component $S_{VC}$ supplied to the phase comparator with phase $\theta_{iV}$. It is assumed that the phase of the local subcarrier supplied to phase comparator 33 by controllable phase shifter 35 at the time of occurrence of the received burst signal is represented as $\theta_B$; and that the phase of this local subcarrier at the time of occurrence of the chrominance reference component in the VIR signal is represented as $\theta_V$. It will be understood that the phase of the local subcarrier can be varied rapidly in response to the burst error signal $E_B$ supplied to local oscillator 34 and in response to the phase control signal supplied to controllable phase shifter 35 by gain controlled amplifier 40.

Figure 3F:
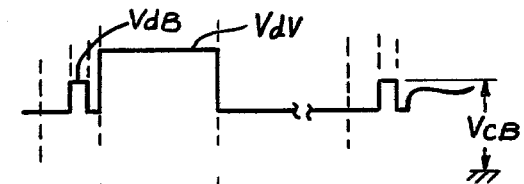

Let it be assumed that phase comparator 33 produces the burst phase error voltage $V_{dB}$, shown in FIG. 3F, corresponding to the error between the phase $\theta_{iB}$ of the received burst signal and the phase $\theta_B$ of the local subcarrier. Let it be further assumed that the phase comparator produces the VIR phase error voltage $V_{dV}$, shown in FIG. 3F, as a function of the difference between the phase $\theta_{iV}$ of the received chrominance reference component and the phase $\theta_V$ of the local subcarrier. The burst phase error voltage $V_{vB}$ is sampled in sample-and-hold circuit 37 by burst gate pulses $P_B$ to produce the burst error signal $E_B$. This burst error signal is supplied as a phase control signal to local oscillator 34, thereby adjusting the phase $\theta_o$ of the oscillating signal generated thereby. It is appreciated that the phase of this local oscillating signal is adjusted in a direction to minimize the burst error signal $E_B$.

Figure 3G:
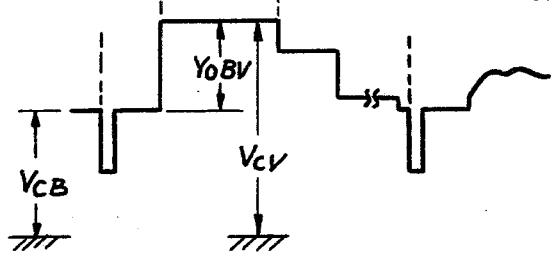

The VIR phase error voltage $V_{dV}$ supplied to sample-and-hold circuit 36 is sampled therein by VIR gate pulses $P_V$ to produce the VIR error signal $E_V$. This error signal is used as a gain controlling signal to determine the gain of gain controlled amplifier 40. Accordingly, amplifier 40 amplifier the luminance signal, designated $Y_{iBV}$, supplied thereto from delay circuit 24 to a level determined by this luminance signal and the gain of the amplifier which, in turn, is established by the VIR error signal $E_V$. The amplified luminance signal, designated $Y_{oBV}$, is supplied as a phase control signal to controllable phase shifter 35. As this phase control signal changes, either because the luminance signal $Y_{iBV}$ varies or because the VIR error signal $E_V$ varies, the phase shift imparted to the local oscillating signal generated by local oscillator 34 correspondingly varies. FIG. 3G represents the amplified luminance signal $Y_{oBV}$ produced by gain controlled amplifier 40 in response to the different luminance levels of the VIR signal, as this VIR signal appears at the output of delay circuit 24. Assuming that the pedestal level of the luminance signal has a voltage $V_{CB}$, the voltage $V_{CV}$ produced by gain controlled amplifier 40 in response to the luminance level upon which the chrominance reference component is superimposed is seen to exceed the pedestal level voltage, the difference therebetween being equal to the amplified luminance level $Y_{oBV}$. The luminance reference component is seen to be less than the luminance level upon which the chrominance reference component is superimposed, and the black reference component is seen to be still less than the luminance reference component. FIG. 3G thus illustrates how the voltage waveform at the output of gain controlled amplifier 40 changes as a function of the changes in the luminance signal supplied thereto from the luminance channel of the video display apparatus. Hence, the phase of the local oscillating signal provided at the output of controllable phase shifter 35 will vary as a function of this amplified luminance signal.

Let it be assumed that the gain of phase comparator 33 is expressed as $K_d$ volts/radian. Accordingly, the burst phase error voltage $V_{dB}$ and the VIR phase error voltage $V_{dv}$ produced by the phase comparator are represented as:

$$V_{dB} = K_d(\theta_{iB} - \theta_B) \qquad (1)$$

$$V_{dV} = K_d(\theta_{iV} - \theta_V) \tag{2}$$

If the transfer function of low pass filter 38 is represented as $F_B(s)$ and the transfer function of low pass filter 39 is represented as $F_V(s)$, then the burst error signal $E_B$ and the VIR error signal $E_V$ may be expressed as:

$$E_B = F_B(s) V_{dB} \tag{3}$$

$$E_V = F_V(s) V_{dV} \tag{4}$$

wherein it is assumed that the gain of each of the sample-and-hold circuits is equal to unity.

It is recalled that, in a preferred embodiment, local oscillator 34 is a voltage-controlled oscillator. Accordingly, the phase $\theta_o$ of the local oscillating signal generated thereby varies with respect to time as a function of the burst error signal $E_B$ supplied thereto by low pass filter 30. The relationship between this varying phase of the local oscillating signal and the burst error signal $E_B$ is represented as:

$$(d\theta_o/dt) = K_o E_B \tag{5}$$

Equation (5) can be rewritten as the Laplace transform $$\theta_o = K_o (E_B/s) \tag{5'}$$

Gain controlled amplifier 40 has a gain G which is determined by the VIR error signal $E_V$ such that $$G = mE_V \tag{6}$$

wherein m is a constant. If the luminance signal supplied to gain controlled amplifier 40 from the luminance channel is represented as $Y_{iBV}$, then the amplified luminance signal produced at the output of the gain controlled amplifier is expressed as:

$$Y_{oBV} = mE_V \cdot Y_{iBV} \tag{7}$$

As shown in FIG. 3G, during the interval that the burst signal $S_B$ is received, the output voltage of gain controlled amplifier 40 is equal to $V_{CB}$, this voltage corresponding to the voltage of the pedestal level. During the interval that the chrominance reference component of the VIR signal is received, the output voltage of gain controlled amplifier 40 is equal to $V_{CV}$. As can be seen from the waveform shown in FIG. 3G, the voltage $V_{CV}$ may be expressed as:

$$V_{CV} = V_{CB} + Y_{oBV} \tag{8}$$

Controllable phase shifter 35 is of the type that imparts a phase shift $\theta$ to an oscillating signal supplied thereto, this phase shift being proportional to an applied control voltage V such that $\theta = K \cdot V$, wherein K is a constant. The phase of the local oscillating signal supplied to controllable phase shifter 35 is equal to $\theta_o$, and this controllable phase shifter imparts an additional phase shift as a function of the voltages $V_{CB}$ and $V_{CV}$ supplied thereto by gain controlled amplifier 40. More particularly, the phase of the local subcarrier provided at the output of controllable phase shifter 35 during the period that the burst signal is received is represented as $\theta_B$, and the phase of this local subcarrier during the period that the chrominance reference component of the VIR signal is received is represented as $\theta_V$. Accordingly, these respective phases $\theta_B$ and $\theta_V$ may be expressed as:

$$\theta_B = \theta_o + KV_{CB} \tag{9}$$

$$\theta_V = \theta_o + KV_{CV} \tag{10}$$

From equations (1), (3), (5') and (9), the phase $\theta_B$ of the local subcarrier produced during the period that the burst signal is received may be rewritten as:

$$\theta_B = \frac{K_o K_d F_B(s)}{s + K_o K_d F_B(s)} \theta_{iB} + \frac{KV_{CB} s}{s + K_o K_d F_B(s)} \tag{11}$$

The first term in equation (11) is recognized as the general equation for a phase-locked loop. The second term in equation (11) may be through of as a disturbance to the phase-locked operation, this disturbance being a function of the factor $KV_{CB}$. Let it be assumed that, at steady state (s=0), the loop gain $K_o K_d F_B(0)$ is sufficiently large such that the second term in equation (11) becomes negligibly small. Consequently, at steady state, the phase $\theta_B$ of the local subcarrier during the period that the burst signal is received is controlled to be equal to the phase $\theta_{iB}$ of the recevied burst signal. This is expressed as:

$$\theta_B = \theta_{iB} \tag{12}$$

It is appreciated that the voltage of the pedestal level $V_{CB}$ provided at the output of gain controlled amplifier 40 varies as a function of the VIR error signal $E_V$. From equation (11) it may be through that the phase $\theta_B$ of the local subcarrier thus may vary as the VIR error signal varies. However, since the loop gain can be made sufficiently large, variations in the VIR error signal, which result in variations in the voltage $V_{CB}$, have only a negligible effect upon the phase $\theta_B$ of the local subcarrier during the period that the burst signal is received.

From equation (2), (4), (6), (7), (8) and (10) the phase $\theta_V$ of the local subcarrier during the period that the chrominance reference component of the VIR signal is received can be expressed as:

$$\theta_V = \frac{KK_d m Y_{iBV} F_V(s)}{1 + KK_d m Y_{iBV} F_V(s)} \theta_{iV} + \frac{\theta_o + KV_{CB}}{1 + KK_d m Y_{iBV} F_V(s)} \tag{13}$$

The second term in equation (13) can be rewritten in accordance with equations (9) and (12) as:

$$\theta_V = \frac{KK_d m Y_{iBV} F_V(s)}{1 + KK_d m Y_{iBV} F_V(s)} \theta_{iV} + \frac{\theta_{iB}}{1 + KK_d m Y_{iBV} F_V(s)} \tag{13'}$$

If the steady state loop gain $KK_d m K_{iBV} F_V(O)$ is made sufficiently large, then the second term in equation (13') can be neglected, and this equation can be closely approximated as $$\theta_V = \theta_{iV} \tag{14}$$

Hence, the closed loop illustrated in FIG. 2 which is responsive to the VIR phase error voltage produced by phase comparator 33 is effective to control the phase $\theta_V$ of the local subcarrier during the period that the chrominance reference component of the VIR signal is received to be equal to the phase of that chrominance reference component.

From equations (8), (9), (10), (12) and (14), the amplified luminance signal $Y_{oBV}$ supplied as the phase control signal to the controllable phase shifter 35 by gain controlled amplifier 40 can be expressed as:

$$Y_{oBV} = (\theta_{iV} - \theta_{iB}/K) \qquad (15)$$

Figure 4:
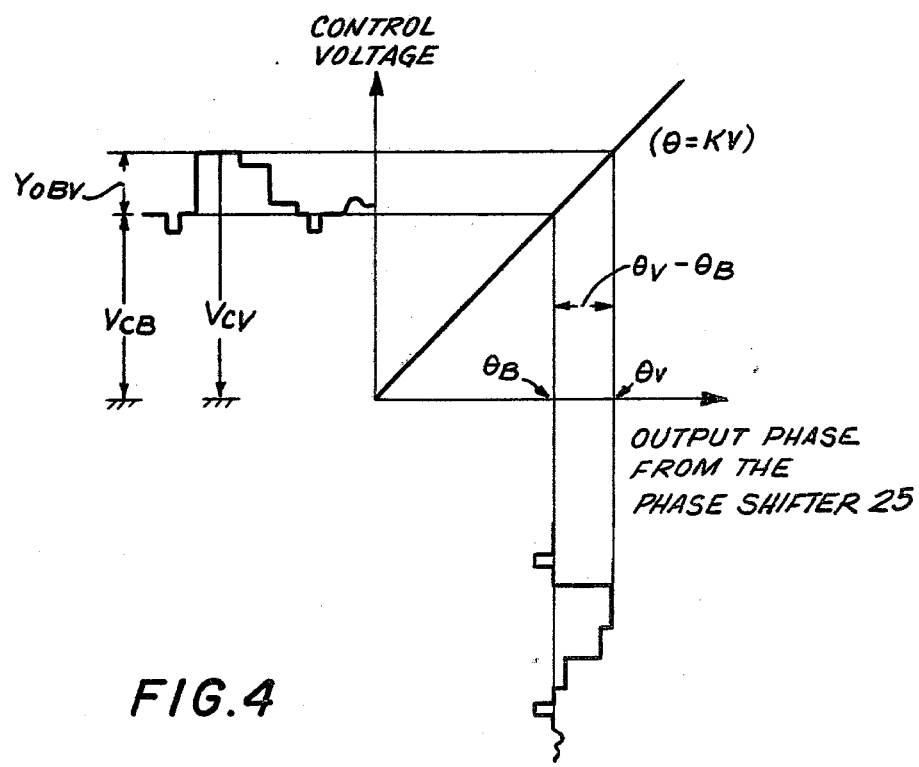
FIG. 4 is a graphical representation of the operating characteristics of the embodiment shown in FIG. 2.

From equation (15) it is seen that the level of the amplified luminance signal $Y_{oBV}$ varies as a function of the differential phase $(\theta_{iV} - \theta_{iB})$ between the chrominance reference component of the received VIR signal and the received burst signal. Moreover, the polarity of the amplified luminance signal also is dependent upon this differential phase. FIG. 4 is a graphical representation of the relationship between the level of the amplified luminance signal $Y_{oBV}$ and the phase of the local subcarrier produced at the output of controllable phase shifter 35. In particular, the abscissa represents the phase of this local subcarrier and the ordinate represents the phase-controlling voltage supplied to the controllable phase shifter. It is seen that, during the period that the burst signal is received, the amplified luminance signal has a voltage level equal to $V_{CB}$. At this time, the phase of the local subcarrier is equal to $\theta_B$. When the amplifier luminance signal $Y_{oBV}$ exhibits its maximum voltage $V_{CV}$ corresponding to the luminance level onto which the chrominance reference component of the VIR signal is superimposed, the phase of the local subcarrier is equal to $\theta_V$. Thus, the local subcarrier is phase modulated in accordance with the level of the amplified luminance signal produced by gain controlled amplifier 40. A maximum phase shift is imparted by the controllable phase shifter to the local subcarrier when the luminance signal is at its maximum amplitude. For the purpose of the present discussion, a linear phase modulation characteristic is assumed for controllable phase shifter 35.

The hue of the reproduced video picture is dependent upon the phase of the local subcarrier which is supplied to color demodulator 21. Because the phase of this local subcarrier is made dependent upon the level of the received luminance signal, proper hue compensation, or correction, can be made when the luminance level of the corresponding chrominance signal varies. Thus, the respective demodulated color difference signals, which otherwise would exhibit hue distortion because of the changing levels of the luminance signal, exhibit correct hue characteristics, notwithstanding such variations in the level of the luminance signal. Therefore, not only does the displayed video picture exhibit the proper hue characteristics when the level of the luminance signal is equal to 70 IRE units, the luminance level of Caucasian skin tones, but the video picture will be compensated to have the proper hue characteristics at other luminance levels, such as at a luminance level of 40–60 IRE units, corresponding to Mongolian or Asian skin tones, and for luminance levels of 20–40 IRE units, corresponding to Negro skin tones.

Another embodiment of the present invention is illustrated in FIG. 5 wherein those elements which are substantially identical to the aforedescribed elements shown in FIG. 2 are identified by the same reference numerals. The difference between the embodiment shown in FIG. 5 with the aforedescribed embodiment of FIG. 2 is that the local oscillating circuit previously comprised of local oscillator 34 and controllable phase shifter 35 now is represented merely as local oscillator 34. Also, the burst error signal signal $E_B$ is supplied to local oscillator 34 through a matrix circuit 42. This matrix circuit may, for example, comprise a conventional resistor matrix having one input coupled to low pass filter 38 and another input coupled to gain controlled amplifier 40. The phase control signal produced by gain controlled amplifier 40 thus is supplied through matrix 42 to local oscillator 34 to adjust the phase of the local subcarrier produced thereby. Also, rather than supplied the luminance signal directly to gain controlled amplifier 40, as in the embodiment of FIG. 2, a differentiating circuit 41 is provided to supply a differentiated version of the luminance signal to the gain controlled amplifier. In all other respects, the embodiment of FIG. 5 is substantially the same as the embodiment of FIG. 2.

The embodiment illustrated in FIG. 5 operates in substantially the same way as the embodiment of FIG. 2 described in detail hereinabove. Thus, the burst error signal $E_B$ which is produced by sampling the burst phase error voltage $V_{dB}$ produced by phase comparator 33 at the time of occurrence of the burst signal is used to vary the phase of the local subcarrier generated by local oscillator 34. Thus, the phase of the local subcarrier is controlled to be equal to the phase $\theta_{iB}$ of the received burst signal.

The gain of gain controlled amplifier 40 is determined by the VIR error signal $E_V$ which is produced by sampling the VIR phase error voltage $V_{dV}$ produced by phase comparator 33 during the period that the chrominance reference component of the VIR signal is received. It should be appreciated that gain controlled amplifier 40 functions to amplify the differentiated luminance signal rather than the luminance signal per se so that the output of this gain controlled amplifier, when applied to local oscillator 34, varies the phase of the local subcarrier as a function of the received luminance signal. If the luminance signal is not differentiated, then the output of gain controlled amplifier 40, when applied to local oscillator 34, will vary the frequency of the local subcarrier. Hence, in the embodiment illustrated in FIG. 5, the combination of differentiating circuit 41, gain controlled amplifier 40 and matrix circuit 42 functions to control the phase of the local subcarrier in accordance with the level of the received luminance signal. That is, the differentiating circuit and gain controlled amplifier may be thought of as deriving a phase control signal dependent upon the level of the received luminance signal. Of course, this phase control signal also is dependent upon the VIR error signal derived from phase comparator 33.

While the present invention has been particularly shown and described with reference to certain preferred embodiments, it will be readily apparent to those of oridinary skill in the art that various changes and modifications in form and details can be made without departing from the spirit and scope of the invention. For example, in the embodiments described with respect to FIGS. 2 and 5, the phase of the local subcarrier is varied as a function of the VIR and burst error signals, and also as a function of the level of the received luminance signal. Alternatively, the phase of the chrominance signal $S_C$ supplied to color demodulator 21 can be varied. For hue compensation, it is important that the relative phase between the received chrominance signal and the local subcarrier which is used for demodulating that chrominance signal be controlled. It is, therefore, intended that the appended claims be interpreted as including this as well as other such changes and modifications.

What is claimed is:

1. A hue correction circuit for use in video display apparatus of the type responsive to a composite color video signal for displaying a color image corresponding thereto and wherein said composite color video signal includes luminance, chrominance and burst signals and is provided with a vertical interval reference (VIR) signal during the vertical interval thereof, said VIR signal having a chrominance reference component, said hue correction circuit comprising:

controllable oscillator means for generating a reference oscillating signal of controllable phase for use in demodulating said chrominance signal;

first phase control means responsive to said burst signal for deriving a first phase control signal as a function of the phase error between said burst signal and said reference oscillating signal, said first phase control signal being applied to said local oscillator means to vary the phase thereof for minimizing said phase error;

gain controlled amplifier means connected to receive said luminance signal and having a controllable gain for deriving a second phase control signal as a function of the level of said luminance signal, said second phase control signal being applied to said local oscillator means to vary the phase thereof; and gain controlling means responsive to said VIR signal for supplying a gain controlling signal to said gain controlled amplifier means as a function of the phase error between said chrominance reference component of said VIR signal and said reference oscillating signal.

2. The hue correction circuit of claim 1 wherein said controllable local oscillator means comprises a voltage-controlled oscillator whose output is coupled to controllable phase shift means, said reference oscillating signal being provided at the output of said controllable phase shift means.

3. The hue correction circuit of claim 2 wherein said first phase control signal is supplied as a control voltage to said voltage-controlled oscillator to control the phase of the output of said voltage-controlled oscillator, and wherein said second phase control signal is supplied as a control signal to said controllable phase shift means to control the phase of the reference oscillating signal provided at the output of said controllable phase shift means.

4. The hue correction circuit of claim 1 wherein said controllable oscillator means comprises a voltage-controlled oscillator whose output constitutes said reference oscillating signal.

5. The hue correction circuit of claim 4 further comprising matrix means for receiving said first phase control signal and applying same to said voltage-controlled oscillator, and for receiving said second phase control signal and applying same to said voltage-controlled oscillator, each of said first and second phase control signals controlling the phase of said reference oscillating signal provided at the output of said voltage-controlled oscillator.

6. The hue correction circuit of claim 5 wherein said gain controlled amplifier means comprises differentiating means for differentiating same luminance signal; and a variable gain amplifier coupled to said differentiating means for amplifying the differentiated luminance signal and for supplying said amplified luminance signal to said matrix means as said second phase control signal, the gain of said variable gain amplifier being determined by said gain controlling signal.

7. The hue correction circuit of claim 1, 2, 3, 4, 5 or 6 further comprising phase comparator means having one input for receiving said chrominance and burst signals and said chrominance reference component of said VIR signal and another input for receiving said reference oscillating signal, said phase comparator means producing error signals at an output thereof as a function of the phase difference between the signals received at the inputs thereof; first means coupled to the output of said phase comparator means to produce said first phase control signal; and second means coupled to the output of said phase comparator means to produce said gain controlling signal.

8. The hue correction circuit of claim 7 further comprising burst pulse generating means for generating burst pulses at the times of occurrence of said burst signals, and VIR pulse generating means for generating VIR pulses at the times of occurrence of the chrominance reference component of said VIR signals; and wherein said first means comprises sample-and-hold means responsive to said burst pulses for sampling the error signal produced by said phase comparator means, and said second means comprises sample-and-hold means responsive to said VIR pulses for sampling the error signal produced by said phase comparator means.

9. A hue correction circuit for use in video display apparatus of the type responsive to a composite color video signal for displaying a color image corresponding thereto and wherein said composite color video signal includes luminance, chrominance and burst signals and is provided with a vertical interval reference (VIR) signal during the vertical interval thereof, said VIR signal having a chrominance reference component, said hue correction circuit comprising:

a controllable local oscillator for generating a reference oscillating signal of controllable phase for use in demodulating said chrominance signal;

a phase comparator having an input for receiving said burst signals and said chrominance reference component and another input for receiving said reference oscillating signal, said phase comparator having an output for producing error signals as a function of the phase difference between the signals received at the respective inputs thereof;

first means coupled to said output of said phase comparator to produce a first phase control signal in response to the error signal produced when said burst signal is received, said first phase control signal being applied to said local oscillator to control the phase of said reference oscillating signal;

a gain controlled amplifier connected to receive said luminance signal and having a controllable gain for producing a second phase control signal as a function of the level of said luminance signal, said second phase control signal varying the relative phase between said chrominance signal and said reference oscillating signal; and second means coupled to said output of said phase comparator to produce a gain control signal in response to the error signal produced when said chrominance reference component is received, said gain control signal determining the gain of said gain controlled amplifier.

10. The hue correction circuit of claim 9 further comprising variable phase shift means connected to receive said reference oscillating signal and responsive to said second phase control signal to vary the phase of said reference oscillating signal and thereby vary the relative phase between said chrominance signal and said reference oscillating signal.

11. The hue correction circuit of claim 9 further comprising matrix means for supplying said first phase control signal to said local oscillator and for supplying said second phase control signal to said local oscillator, the latter varying the phase of said reference oscillating signal to vary the relative phase between said chrominance signal and said reference oscillating signal; and additionally comprising differentiating means for receiving said luminance signal and for differentiating same, said differentiated luminance signal being amplified by said gain controlled amplifier.

* * * * *